(12) United States Patent
Sumner et al.

(10) Patent No.: US 9,493,083 B1
(45) Date of Patent: Nov. 15, 2016

(54) ELECTRICAL PLUG ADAPTER

(71) Applicant: DELPHI TECHNOLOGIES, INC., Troy, MI (US)

(72) Inventors: Randall C. Sumner, New Wilmington, PA (US); Terry A. George, Salem, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/746,019

(22) Filed: Jun. 22, 2015

(51) Int. Cl.
*H01R 25/00* (2006.01)
*H01R 27/02* (2006.01)
*H01R 33/00* (2006.01)
*B60L 11/18* (2006.01)
*H01R 13/639* (2006.01)

(52) U.S. Cl.
CPC ......... *B60L 11/1818* (2013.01); *H01R 13/639* (2013.01); *H01R 27/02* (2013.01)

(58) Field of Classification Search
CPC .. B60L 11/1818; H01R 13/639; H01R 27/02
USPC .......................... 439/346, 170, 692, 638, 352
See application file for complete search history.

(56) References Cited

U.S. PATENT DOCUMENTS

| | | | |
|---|---|---|---|
| 6,699,052 B1 | 3/2004 | Poran | |
| 7,287,994 B1 * | 10/2007 | Liao | H01R 13/6273 439/172 |
| 8,951,075 B2 | 2/2015 | Ekchian | |
| 2003/0211767 A1 | 11/2003 | Philips et al. | |
| 2005/0014412 A1 * | 1/2005 | Wharton | H01R 13/633 439/352 |

FOREIGN PATENT DOCUMENTS

WO       2014144990 A1    9/2014

\* cited by examiner

*Primary Examiner* — Javaid Nasri
(74) *Attorney, Agent, or Firm* — Robert J. Myers

(57) ABSTRACT

An electrical adapter device includes an electrical receptacle defined by a first technical standard, e.g. NEMA 6-15R, NEMA 5-20R, or NEMA 6-20R, disposed within a first face of the electrical adapter device and configured to receive a first electrical plug defined by the same first technical standard. The adapter also includes a second electrical plug, e.g. NEMA 5-15P defined by a second technical standard projecting from a second face of the electrical adapter device. The adapter further includes a moveable locking tang projecting from the first face of the electrical adapter device and configured to be received within a complementary aperture defined by a first plug housing containing the first electrical plug. The locking tang is removable from the aperture when in a disengaged position and the locking tang is secured within the aperture when in an engaged position.

19 Claims, 4 Drawing Sheets

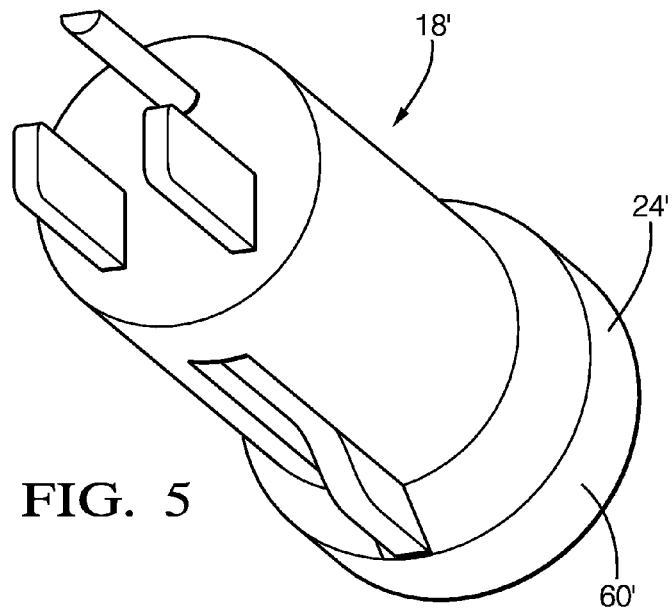
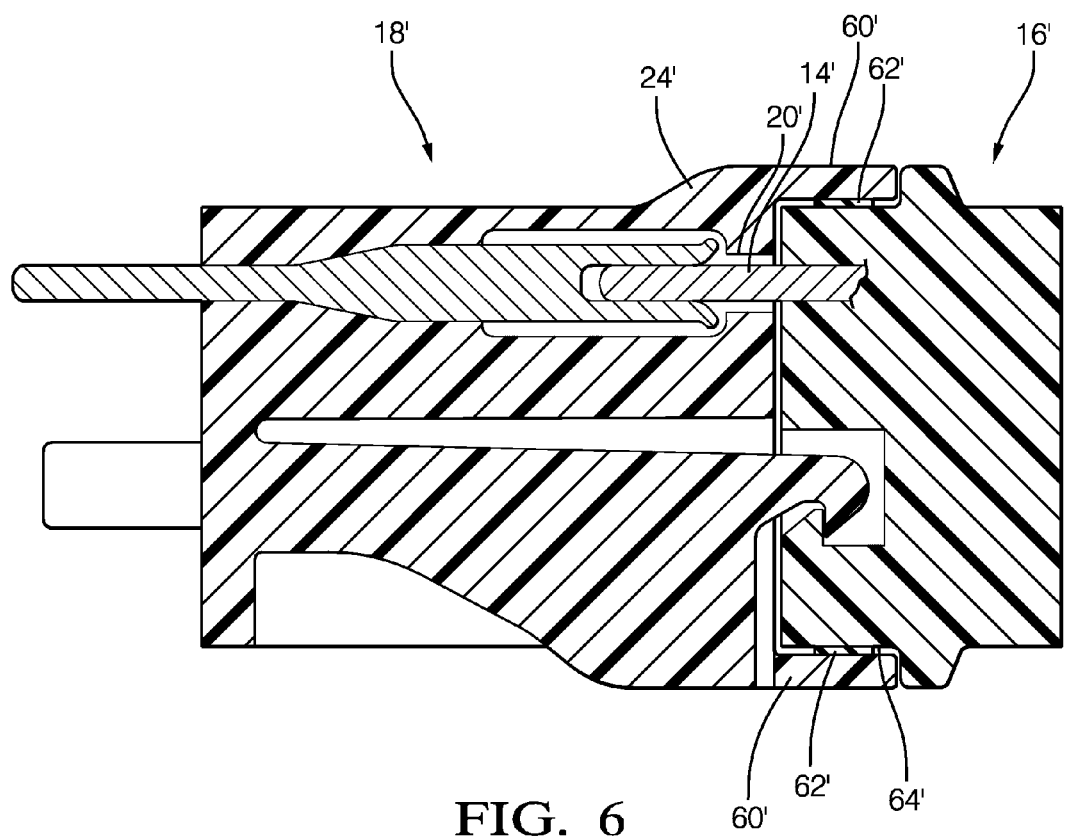

ELECTRICAL PLUG ADAPTER

TECHNICAL FIELD OF THE INVENTION

The invention relates to an electrical plug adapter, particularly an electrical plug adapter configured to allow a plug connector meeting a particular plug configuration standard to mate with a receptacle meeting a different and incompatible receptacle configuration standard.

BACKGROUND OF THE INVENTION

National technical standards exist to define the physical and electrical characteristics of electrical plugs and their associated receptacles. The intent of these technical standards is to promote safety and operability between power sources and electronic devices that require electrical power. Historically, a particular electronic device would be designed for a specific source voltage and maximum current source and so would be manufactured with a fixed plug that is configured to insert into its complementary power-source receptacle. For example, an electronic device in North America requiring 220 volts and drawing a maximum current of 20 amperes would be supplied with a plug meeting the National Electrical Manufacturers Association (NEMA) 6-20 standard configured for insertion into a receptacle also conforming to the NEMA 6-20 standard. However, the NEMA 6-20 plug cannot be inserted into a receptacle capable of providing a lower 110 volt source voltage, such as a NEMA 5-15 standard receptacle.

However, electronic devices are currently being manufactured that have built-in power electronics capable of converting various input voltages into an appropriate electrical power for the device. While an electronic device might be configured with a NEMA 6-20 plug, it may be also operable with power provided by a NEMA 5-15 receptacle, even though not physically able to be inserted into the NEMA 5-15 without a plug adapter of some sort.

Regrettably, not every electronic device has built-in power electronics that are capable of accommodating various source voltages. A user that purchases an off-the-shelf electrical plug adapter to make use of a receptacle defined by a first technical standard for their electronic device having a plug defined by a second technical standard runs the risk of inadvertently tripping circuit breakers on the power source or destroying their electronic device because of an incompatible source voltage. Therefore, an adapter that can allow an electronic device to be used with various plug/receptacle combinations while protecting power sources and electronic devices from incompatible adapter and electronic device combinations is desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with one embodiment of the invention, an electrical adapter device is provided. The electrical adapter device includes an electrical receptacle that is defined by a first technical standard. The electrical receptacle is disposed within a first face of the electrical adapter device and is configured to receive a first electrical plug that is also defined by the first technical standard. The electrical adapter device also includes a second electrical plug that is defined by a second technical standard. The second electrical plug projects from a second face of the electrical adapter device. The electrical adapter device further includes a moveable locking tang projecting from the first face of the electrical adapter device. The lock tang is configured to be received within a complementary aperture that is defined by a first plug housing containing the first electrical plug. The locking tang is removable from the aperture when in a disengaged position and is secured within the aperture when in an engaged position.

The electrical adapter device further includes a flexible cantilever beam and a free end of the cantilever beam defines the locking tang. The electrical adapter device may further include an adapter housing, wherein the first face and the second face are disposed on opposite sides of the adapter housing and wherein the cantilever beam is integrally formed with the adapter housing. A portion of the cantilever beam may project beyond a side wall of the adapter housing intermediate the first face and the second face. The adapter housing may have a generally circular cross section.

The locking tang prevents seating of the first electrical plug within the electrical receptacle if the first plug housing does not define the complementary aperture.

The electrical receptacle includes a ground socket, a first power socket and a second power socket and the second electrical plug includes a ground pin, a first power blade and a second power blade. The ground socket is electrically coupled to the ground pin, the first power socket is electrically coupled to the first power blade and the second power socket is electrically coupled to the second power blade. The locking tang may be disposed intermediate the first power socket and the second power socket.

The first technical standard may be selected from the group consisting of the National Electrical Manufacturers Association (NEMA) 6-15R, NEMA 5-20R, and NEMA 6-20R standards and the second technical standard may be the NEMA 5-15P standard. Alternatively, the first technical standard may be the NEMA 5-15R standard and the second technical standard may be selected from the group consisting of the NEMA 6-15P, NEMA 5-20P, and NEMA 6-20P standards.

In accordance with another embodiment of the invention, the adapter housing may define a shroud configured to receive the first plug housing and contain a compliant seal configured surround a perimeter of the first plug housing.

In accordance with yet another embodiment of the invention, an electrical vehicle charging device is provided. The electrical vehicle charging device is capable of receiving electrical power having various source voltages. The electrical vehicle charging device includes an electrical power cord terminated by the first electrical plug defined by the first technical standard described above and the electrical adapter device also described above. The plug housing containing the first electrical plug defines the complementary aperture configured to receive the locking tang.

BRIEF DESCRIPTION OF THE SEVERAL VIEWS OF THE DRAWING

The present invention will now be described, by way of example with reference to the accompanying drawings, in which:

FIG. 5 is a perspective view of a second plug end of an electrical adapter device according to another embodiment; and FIG. 6 is a cut-away side view of the electrical adapter device of FIG. 5 according to another embodiment.

DETAILED DESCRIPTION OF THE INVENTION

An electrical adapter device, hereinafter referred to as the adapter, is presented herein. The adapter has a receptacle on one end that conforms to a particular technical standard and has a plug on the other end that conforms to a non-compatible technical standard. The adapter may be used to connect a plug conforming to one technical standard, such as the National Electrical Manufacturers Association (NEMA) 6-15P, NEMA 5-20P, or NEMA 6-20P to a receptacle conforming to a different technical standard, such as NEMA 5-15R.

As used herein, a "technical standard" is a formalized public document that defines a uniform physical and/or electrical configuration for a product, whether promulgated by a standards body, a regulatory body, or as a "de facto" standard set by widespread adoption. Technical standards include the standards established by the National Electrical Manufacturers Association ("NEMA") in the United States for use with alternating current (AC) electrical power connections, including but not limited to NEMA 5-15, NEMA 6-15, NEMA 5-20, and NEMA 6-20. Although a particular standard may have sub sections defining a receptacle configuration and plug configuration (and so designated with 'R' or 'P'), the description herein treats "a technical standard" as encompassing both receptacle and plug configurations in the same technical standard. The technical standards may also include standards defining electrical plugs and receptacles from outside of the United States.

The receptacle end of the adapter has a moveable locking tang that protrudes from the receptacle end and is configured to be inserted within a complementary aperture defined in a plug housing of a mating plug connected in the receptacle. The locking tang secures the adapter to the plug housing when it is engaged within the aperture and releases the adapter from the plug housing when it is moved to a disengaged position. The locking tang also prevents the mating plug from seating within the receptacle if the plug housing lacks the complementary aperture. Thus, the adapter may not be used with electrical devices, such as electric vehicle battery charging devices, that do not have a plug housing configured to accept the adapter.

Figures 1A, 1B:
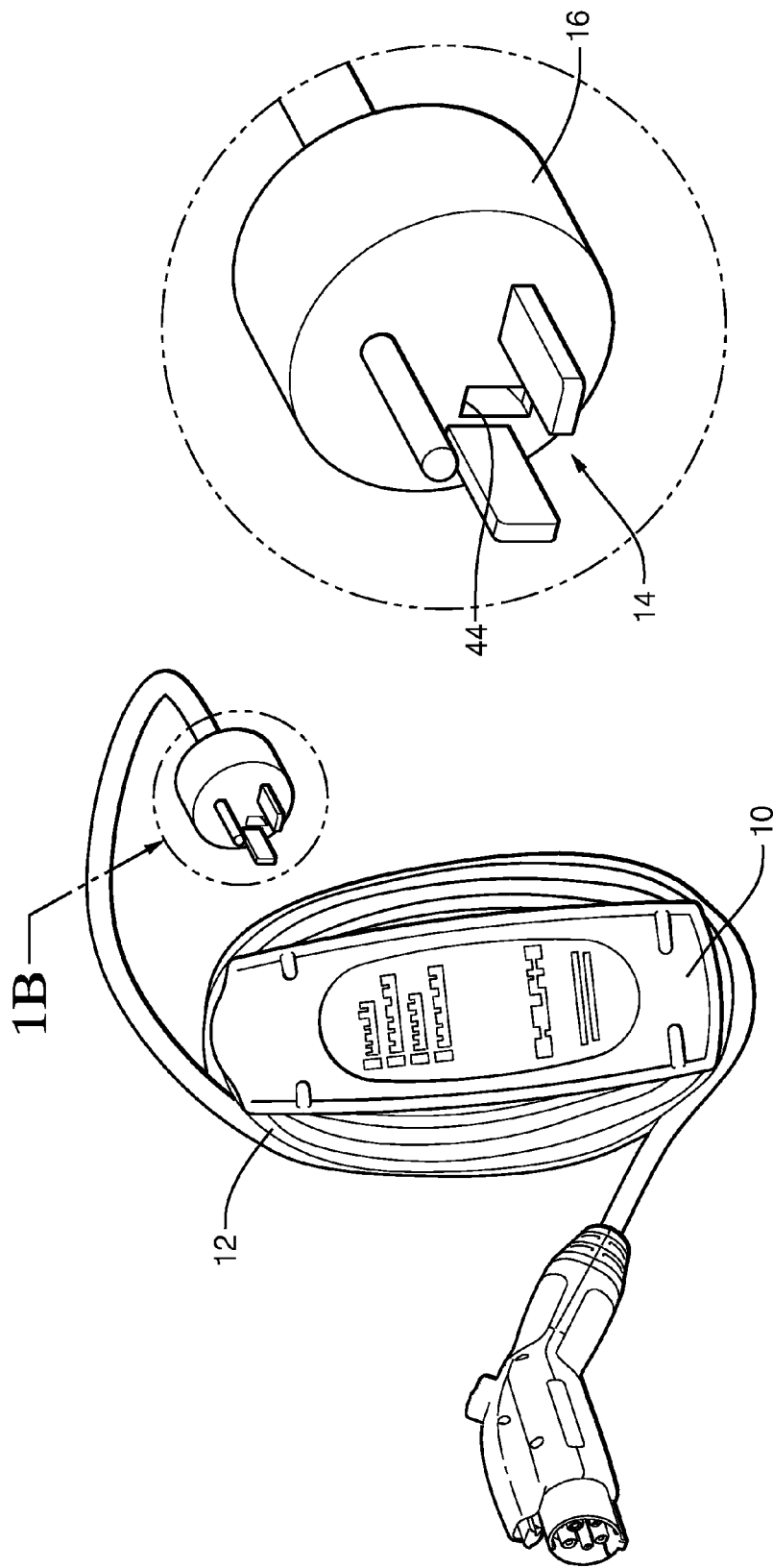
FIG. 1A is a perspective view of an electric vehicle battery charging device having a power cord terminated by a first plug according to one embodiment.
FIG. 1B is a close-up perspective view of the first plug in FIG. 1A defined by a first technical standard according to one embodiment.

FIG. 1A illustrates a non-limiting example of an electronic device 10, in this case an electric vehicle battery charging device 10 that has a power supply cord 12 terminated by a first electrical plug 14 contained within a first plug housing 16. The electric vehicle battery charging device 10 is designed to operate from either a 110V/60 Hz AC or a 220V/60 Hz power source (not shown). The first plug 14, as shown in FIG. 1B, conforms to the NEMA 6-20 standard used with 220V sources, in this case the NEMA 6-20P standard.

Figure 2:
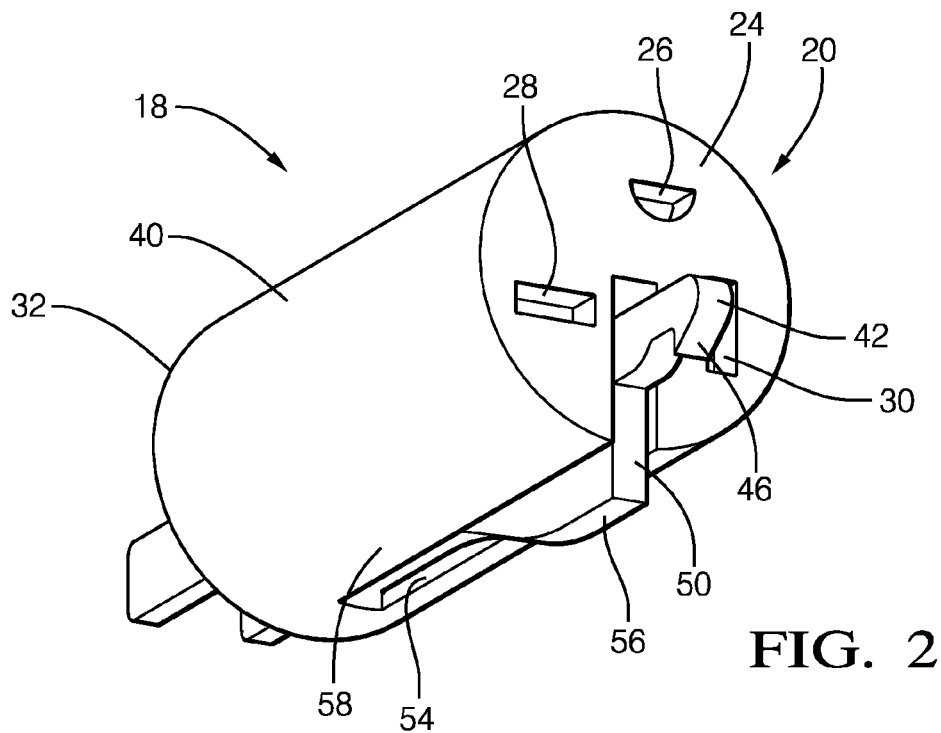
FIG. 2 is a perspective view of a receptacle end of an electrical adapter device according to one embodiment.
Figure 3:
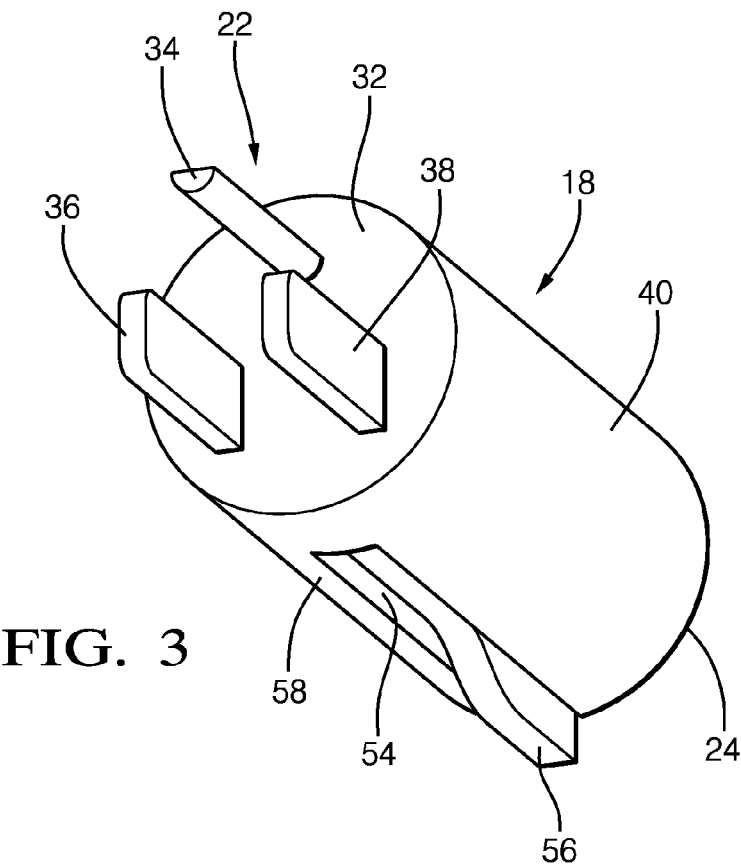
FIG. 3 is a perspective view of a second plug end of the electrical adapter device of FIG. 2 according to one embodiment.

A non-limiting example of an adapter 18 is shown in FIGS. 2 and 3. The adapter 18 has an electrical receptacle 20 and a second electrical plug 22 that are defined by different technical standards. As illustrated in FIG. 3, one end 24 of the adapter 18 contains an electrical receptacle 20 conforming to the NEMA 6-20 standard., in this case the NEMA 6-20R standard. The receptacle 20 is configured to accept the first plug 14 conforming to the same NEMA 6-20 standard. The receptacle 20 contains a ground socket 26, a first power socket 28, and a second power socket 30.

As shown in FIG. 3, the other end 32 of the adapter 18 contains a second electrical plug 22 conforming to a different technical standard than the electrical receptacle 20. In this example, the second plug 22 conforms to the NEMA 5-15P standard used with 110V sources. The second plug 22 contains a ground pin 34, a first power blade 36, and a second power blade 38. The ground socket 26 is electrically coupled to the ground pin 34, the first power socket 28 is electrically coupled to the first power blade 36, and the second power socket 30 is electrically coupled to the second power blade 38 within an adapter housing 40 having a generally circular cross section.

The adapter 18 includes a moveable locking tang 42 protruding from the face of the receptacle 20 that is configured to be received within a corresponding complementary aperture 44 in the face of the first plug 14. The locking tang 42 has a generally rectangular cross section and the aperture 44 has a generally rectangular shape. In alternative embodiments, the locking tang 42 may have a generally round cross section and the aperture may have a generally oval shape. The locking tang 42 is located between the first power socket 28 and the second power socket 30 of the receptacle 20. The aperture 44 is correspondingly located between the first power blade 36 and the second power blade 38 of the first plug 14. The locking tang 42 extends from a face of the receptacle 20 to a distance that prevents any other NEMA plug lacking a corresponding aperture from seating properly, thus preventing use of the adapter 18 with a plug attached to a non-authorized electrical device which may not have circuitry to accommodate various source voltages. Alternative embodiments of the adapter may include multiple locking tangs or the locking tang 42 could be located in a different portion of the face of the receptacle 20. The first plug 14 in these embodiments are reconfigured accordingly.

Figure 4:
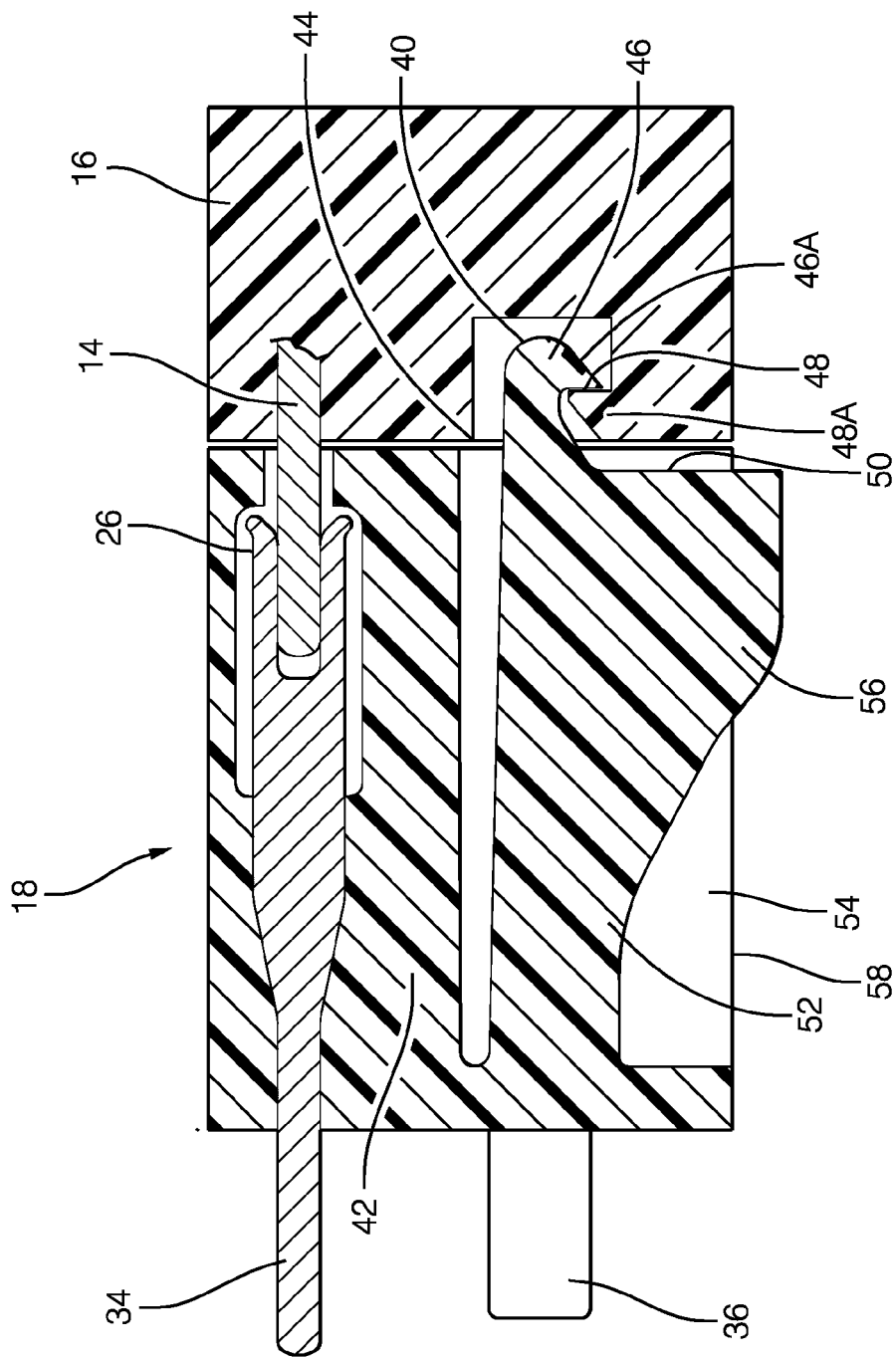
FIG. 4 is a cut-away side view of the electrical adapter device of FIG. 2 according to one embodiment.

As shown in FIGS. 2 and 4, the locking tang 42 defines a tooth 46 that contacts and engages an inner wall 48 of the aperture 44, thus securing the adapter 18 to the first plug 14. The locking tang 42 is moveable from the engaged position to a disengaged position where the tooth 46 is no longer contacting inner wall 48 allowing the locking tang 42 to be removed from the aperture 44 and the adapter 18 to be separated from the first plug 14. A pair of ramps 46A, 48A on the leading edge of the tooth 46 and in the entrance of the aperture 44 cooperate to move the locking tang 42 from the engaged portion to the disengaged position as the locking tang 42 enters the aperture 44.

Also as illustrated in FIGS. 2 and 4, the locking tang 42 is defined by a free end 50 of a resilient cantilever beam 52 that is integrally formed within a channel 54 in the adapter housing 40. A release portion 56 of the cantilever beam 52, hereinafter referred to as the release handle 56 protrudes beyond an outer side wall 58 of the adapter housing 40. An operator (not shown) may move the locking tang 42 from the engaged position to the disengaged position by squeezing the release handle 56 into the channel 54 of the adapter housing 40. In alternative embodiments of the adapter, the locking tang may be attached to a trigger mechanism and held in the engaged position by a spring.

The adapter housing 40 is formed of a dielectric material, e.g. polybutylene terephthalate (PBT), polypropylene (PP), or polyamide (PA, commonly known as NYLON). The sockets 26, 28, 30, pin 34 and blades 36, 38 are formed of a conductive material, such as a copper alloy. Each socket 26, 28, 30 and corresponding blade 36, 38 or pin 34 is an integral assembly that is either insert molded or assembled within the adapter housing 40 as shown in FIG. 4. Alternatively, Each socket 26, 28, 30 and corresponding blade 36, 38 or pin 34 may be separate elements that are connected by a wire (not shown) within a hollow cavity (not shown) defined by the adapter 18.

FIGS. 5 and 6 illustrate an alternative embodiment of the adapter 18'. The receptacle end 24' of the adapter 18' defines a shroud 60' that is configured to receive the first plug housing 16'. A compliant seal 62' within the shroud 60' is configured to contact a perimeter 64' of the first plug housing 16, thereby meeting the IP44 standard according to International Electrotechnical Commission (IEC) standard 60529 for protection of the first plug 14' and receptacle 20' against environmental contaminants, such as water spray.

In alternative embodiments, the shroud may further define a keying ridge that interfaces with a corresponding keying groove in the first plug housing to further prevent the adapter from being used with a non-authorized electrical device. Alternatively, the shroud and the perimeter of the first plug housing may be define a specific shape, e.g. non-round or non-rectangular, to prevent the adapter to be used with a non-authorized electrical device.

Accordingly an electrical adapter device configured to connect an electrical plug conforming to a first technical standard, such as NEMA 6-20 to a receptacle conforming to a different technical standard, such as NEMA 5-15 is provided. The adapter 18 provides the benefit of proprietary use of the adapter 18 because the size and location of the locking tang 42 of the adapter 18 and the side and location of the corresponding aperture 44 of the first plug 14 may be varied to ensure that the adapter 18 may not be used with unauthorized electrical devices having a plug lacking a corresponding aperture, even if they conform to the same technical specification. The cantilever beam 52 and locking tang 42 are integrally formed with the adapter 18, thus reducing the part count and manufacturing costs of manufacturing the adapter 18. Also, because the locking tang is integral to the adapter 18, it does not require detachable parts to secure the adapter to the first plug 14 that may be lost. The inclusion of a shroud 60' and seal 62' in the adapter 18' may provide IP44 water splash protection to the plug/adapter interface. The shroud 60' may further ensure that the adapter 18' may not be used with unauthorized electrical devices having a plug conforming to the same technical specification. In addition, the first plug 14 may be mated flush to a corresponding receptacle when the adapter 18 is not required.

While the illustrated examples contained herein show a plug assembly that is adaptable between NEMA 5-15P and NEMA 6-20P technical standards used primarily in North America, other embodiments may be envisioned where the first and second power, neutral, and ground pins conform to other technical standards used in different parts of the world.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. An electrical adapter device, comprising:
   an electrical receptacle defined by a first technical standard disposed within a first face of the electrical adapter device and configured to receive a first electrical plug defined by the first technical standard;
   a second electrical plug defined by a second technical standard projecting from a second face of the electrical adapter device; and
   a moveable locking tang projecting from the first face of the electrical adapter device and configured to be received within a complementary aperture defined by a first plug housing containing the first electrical plug, wherein the locking tang is removable from the aperture when in a disengaged position and the locking tang is secured within the aperture when in an engaged position and wherein the locking tang prevents seating of the first electrical plug within the electrical receptacle if the first plug housing does not define the complementary aperture.

2. The electrical adapter device according to claim 1, further comprising a flexible cantilever beam, wherein a free end of the cantilever beam defines the locking tang.

3. The electrical adapter device according to claim 2, further comprising an adapter housing, wherein the first face and the second face are disposed on opposite sides of the adapter housing and wherein the cantilever beam is integrally formed with the adapter housing.

4. The electrical adapter device according to claim 3, wherein a portion of the cantilever beam projects beyond a side wall of the adapter housing intermediate the first face and the second face.

5. The electrical adapter device according to claim 3, wherein the adapter housing has a generally circular cross section.

6. The electrical adapter device according to claim 3, wherein the adapter housing defines a shroud configured to receive the first plug housing.

7. The electrical adapter device according to claim 6, wherein the shroud contains a compliant seal configured surround a perimeter of the first plug housing.

8. The electrical adapter device according to claim 1, wherein the electrical receptacle includes a ground socket, a first power socket and a second power socket and the second electrical plug includes a ground pin, a first power blade and a second power blade.

9. The electrical adapter device according to claim 8, wherein the locking tang is disposed intermediate the first power socket and the second power socket.

10. The electrical adapter device according to claim 8, wherein the ground socket is electrically coupled to the ground pin, the first power socket is electrically coupled to the first power blade and the second power socket is electrically coupled to the second power blade.

11. The electrical adapter device according to claim 1, wherein the first technical standard is selected from the group consisting of the National Electrical Manufacturers Association (NEMA) 6-15R, NEMA 5-20R, and NEMA 6-20R standards.

12. The electrical adapter device according to claim 11, wherein the second technical standard is the NEMA 5-15P standard.

13. The electrical adapter device according to claim 1, wherein the first technical standard is the NEMA 5-15R standard.

14. The electrical adapter device according to claim 13, wherein the second technical standard is selected from the group consisting of the NEMA 6-15P, NEMA 5-20P, and NEMA 6-20P standards.

15. An electric vehicle battery charging device capable of receiving electrical power having various source voltages, comprising:
   an electrical power cord terminated by the first electrical plug defined by the first technical standard; and
   the electrical adapter device according to claim 1, wherein the plug housing containing the first electrical plug defines the complementary aperture configured to receive the locking tang.

16. The electric vehicle battery charging device according to claim 15, wherein the first technical standard is selected from the group consisting of the NEMA 6-15R, NEMA 5-20R, and NEMA 6-20R standards.

17. The electric vehicle battery charging device according to claim 16, wherein the second technical standard is the NEMA 5-15P standard.

18. The electric vehicle battery charging device according to claim 15, wherein the first technical standard is the NEMA 5-15R standard.

19. The electric vehicle battery charging device according to claim 18, wherein the second technical standard is selected from the group consisting of the NEMA 6-15P, NEMA 5-20P, and NEMA 6-20P standards.

* * * * *